United States Patent [19]

Suzuki et al.

[11] Patent Number: 5,714,197
[45] Date of Patent: Feb. 3, 1998

[54] METHOD FOR FORMING PATTERNED FILMS USING A FLEXOGRAPHIC APPARATUS HAVING A TEMPERATURE CONTROL DEVICE EMBEDDED IN A SUBSTRATE SUPPORT

[75] Inventors: Masaaki Suzuki, Yokohama; Mayumi Yoshioka, Hadano; Yasuyuki Watanabe, Chigasaki, all of Japan

[73] Assignee: Canon Kabushiki Kaisha, Tokyo, Japan

[21] Appl. No.: 144,561

[22] Filed: Nov. 2, 1993

Related U.S. Application Data

[62] Division of Ser. No. 899,366, Jun. 16, 1992, Pat. No. 5,279,858.

[30] Foreign Application Priority Data

Jun. 20, 1991 [JP] Japan ................... 3-174799

[51] Int. Cl.$^6$ .............................. B05D 5/06; B05D 1/40; B05C 1/00
[52] U.S. Cl. ........................ 427/162; 427/256; 427/428; 427/164; 427/287; 101/41; 101/488; 118/212
[58] Field of Search ..................... 427/162, 256, 427/314, 428, 287; 118/212; 101/487, 488, 474, 41, 126

[56] References Cited

U.S. PATENT DOCUMENTS

| 2,614,493 | 10/1952 | Brodie | 101/488 |
|---|---|---|---|
| 3,631,796 | 1/1972 | Hastings | 101/126 |
| 3,764,587 | 10/1973 | Zunker | 260/80.8 |
| 4,520,726 | 6/1985 | Rouly | 101/123 |
| 4,853,296 | 8/1989 | Fukuyoshi | 428/623 |
| 4,927,738 | 5/1990 | Iwanaga et al. | 430/286 |
| 5,074,213 | 12/1991 | Kurosawa | 101/487 |
| 5,279,858 | 1/1994 | Suzuki et al. | 427/256 |

FOREIGN PATENT DOCUMENTS

| 0257103 | 3/1988 | European Pat. Off. . | |
| 0324238 | 7/1989 | European Pat. Off. . | |
| 0410387 | 1/1991 | European Pat. Off. . | |
| 1786295 | 2/1972 | Germany . | |
| 58-183284 | 10/1983 | Japan | 101/488 |
| 5-096842 | 4/1993 | Japan . | |
| 1076698 | 7/1967 | United Kingdom . | |

OTHER PUBLICATIONS

Patent Abstracts of Japan, JP 55-161,650, vol. 5, No. 37 (Mar., 1981) (M-058).
Patent Abstracts of Japan, JP 60-262,129, vol. 10, No. 143 (May, 1986) (P-459).

*Primary Examiner*—Shrive Beck
*Assistant Examiner*—Fred J. Parker
*Attorney, Agent, or Firm*—Fitzpatrick, Cella, Harper & Scinto

[57] ABSTRACT

A flexographic apparatus including a plate having a relief pattern for printing on a substrate to be printed is provided with a temperature control, preferably embedded within a stage for supporting the substrate to be printed. The substrate to be printed may be controlled at a temperature above 30° C.

2 Claims, 2 Drawing Sheets

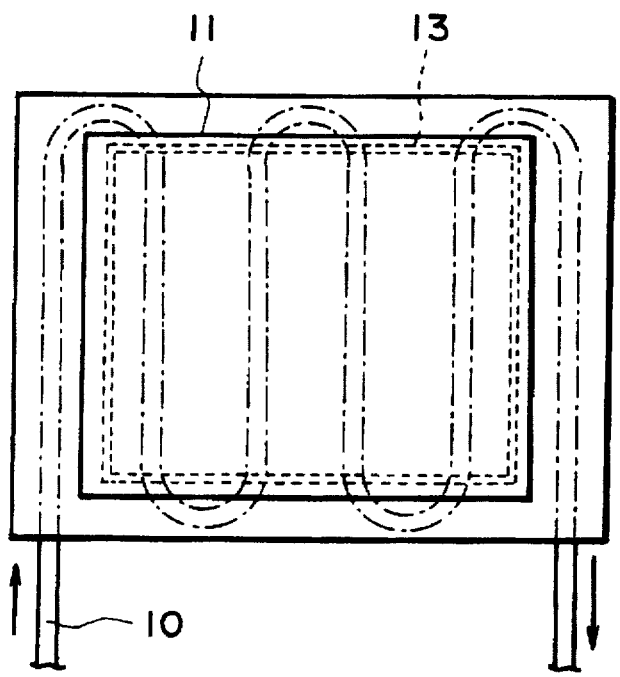
F I G. 2
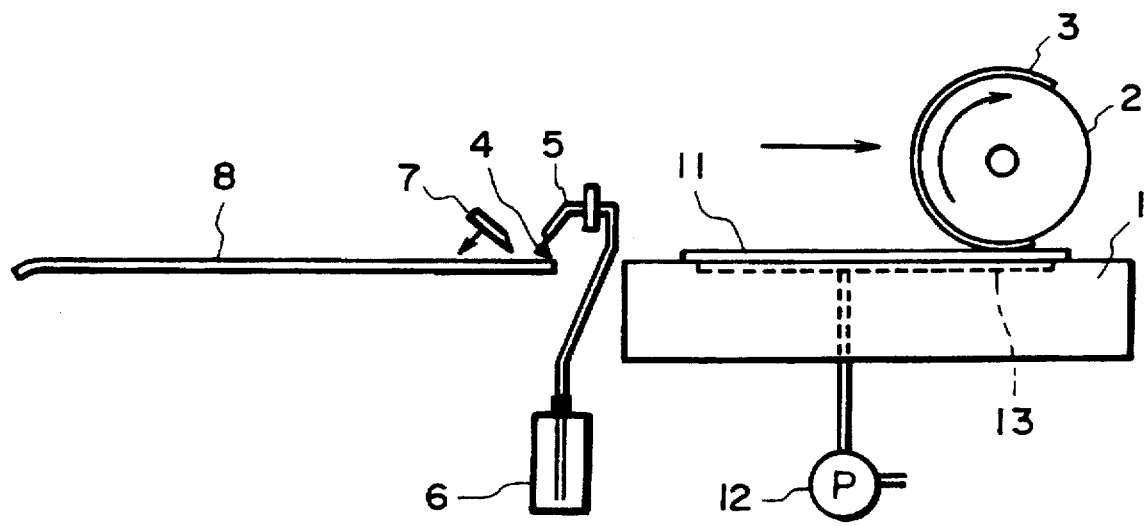
F I G. 3

METHOD FOR FORMING PATTERNED FILMS USING A FLEXOGRAPHIC APPARATUS HAVING A TEMPERATURE CONTROL DEVICE EMBEDDED IN A SUBSTRATE SUPPORT

This application is a division of application Ser. No. 07/899,366, filed Jun. 16, 1992 now U.S. Pat No. 5,279,858.

FIELD OF THE INVENTION AND RELATED ART

The present invention relates to a flexographic apparatus having a temperature control means for keeping a substrate to be printed at a constant temperature and a method of forming a film of an organic polymer or an inorganic oxide thereby.

A conventional flexographic apparatus roughly has an arrangement, as shown in FIG. 3, including a stage 1 to which a substrate (to be printed) 11 is fixed, a cylinder 2, a relief plate 3 having a printing pattern and fastened to the cylinder 2, an extension plate 8, a nozzle 5 for supplying to the extension plate 8 a printing liquid 4 fed from a tank 6, and a doctor blade 7 for extending or spreading the printing liquid on the extension plate 8. A commercially available example of such a flexographic apparatus is "Angstromer" (trade name, available from Nihon Shashin Insatsu K.K.).

However, when an organic polymer solution or an inorganic oxide solution is applied on a substrate by using a conventional flexographic apparatus as described above, the resultant organic polymer or inorganic oxide film is sometimes accompanied with a nonuniform thickness distribution or poor smoothness (undulation), which results in adverse effects to the properties of the film.

SUMMARY OF THE INVENTION

In view of the above-mentioned problem of a conventional flexographic apparatus, an object of the present invention is to provide a flexographic apparatus and a film-forming method using the apparatus, whereby a liquid containing an organic polymer, an inorganic oxide precursor, etc., may be applied to provide a film with an improved uniformity of thickness distribution, an improved smoothness and an improved reproducibility of these factors.

According to the present invention, there is provided a flexographic apparatus, comprising a plate having a prescribed relief pattern for printing on a substrate to be printed, and a temperature control means for controlling the substrate at a temperature above 30° C.

According to another aspect of the present invention, there is provided a flexographic apparatus, comprising a plate having a prescribed relief pattern for printing on a substrate to be printed, a stage for supporting the substrate to be printed, and a temperature control means embedded within the stage.

According to a further aspect of the present invention, there is provided a method for forming an organic polymer film, comprising applying a solution of the organic polymer onto a substrate to be printed by a flexographic apparatus while controlling the substrate to be printed at a temperature above 30° C.

According to a further aspect of the present invention, there is provided a method for forming an inorganic oxide film, comprising applying a solution of an inorganic oxide precursor onto a substrate to be printed by a flexographic apparatus while controlling the substrate to be printed at a temperature above 30° C.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 2 is a plan view showing a stage supporting a substrate to be printed used in the apparatus shown in FIG. 1.

FIG. 3 is a front view showing a conventional flexographic apparatus.

DESCRIPTION OF THE PREFERRED EMBODIMENTS

Figure 1:
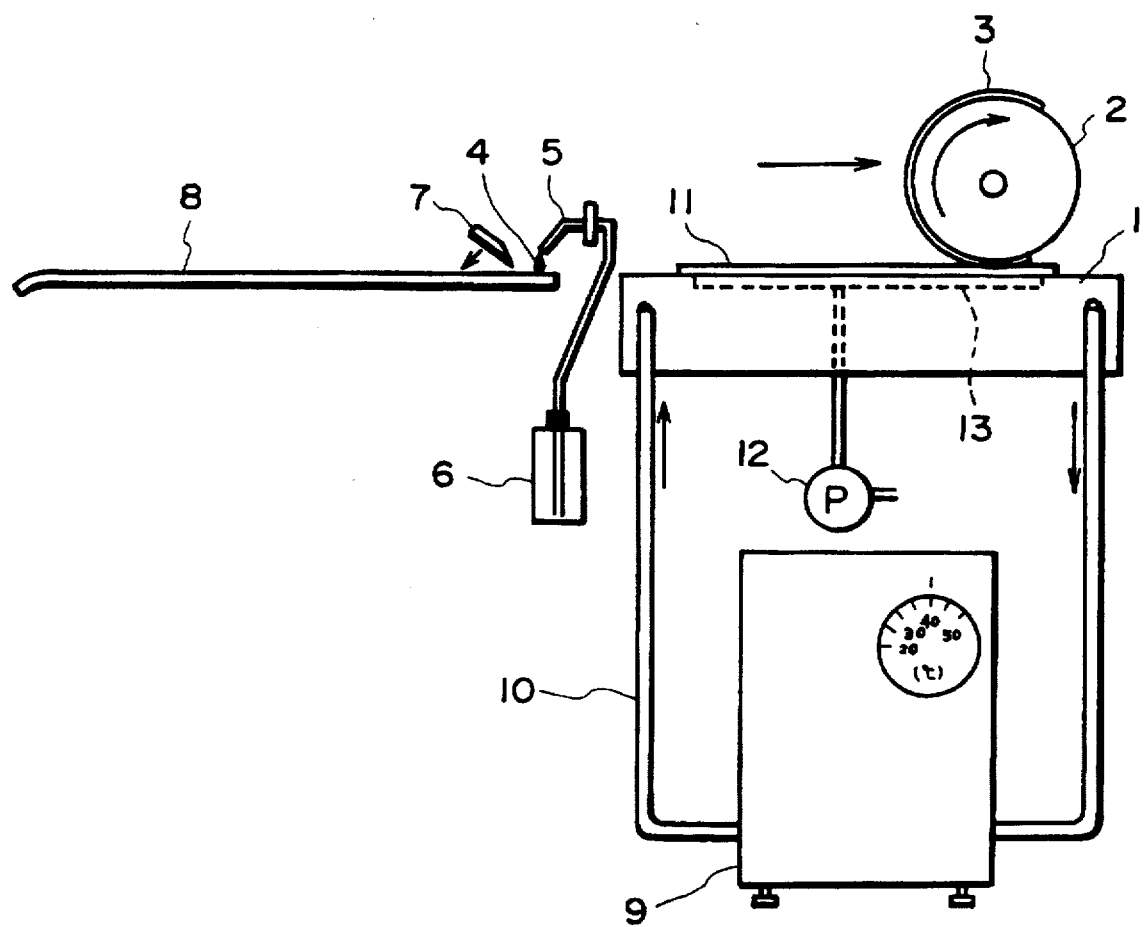
FIG. 1 is a front view showing an outline of a flexographic apparatus according to the present invention.

The temperature control means used in the present invention may for example be embodied as a temperature control mechanism for keeping at a constant temperature a stage for supporting or fastening a substrate to be printed in a flexographic apparatus.

In a preferred embodiment, a liquid, preferably a solution, containing an organic polymer or an inorganic oxide precursor may be applied onto a substrate to be printed which is supported on the stage and controlled at a temperature above 30° C. within an accuracy of ±5° C., thereby forming a film of such an organic polymer or inorganic oxide.

Examples of such an organic polymer film may include: color filters comprising colored resins of, e.g., polyamides, and protective films thereon; films of photoresists, such as photosensitive phenol-novolak resin; alignment films for liquid crystal devices, comprising, e.g., polyimide resins; and sealants for liquid crystal devices, comprising e.g., epoxy-type adhesives. Further, the inorganic oxide film thus formed may for example be an insulating film for liquid crystal devices.

A conventional flexographic apparatus is not equipped with a temperature control mechanism so that the temperature of the substrate to be printed is affected by the environment. In other words, the flexographic printing has been possible only in the neighborhood of room temperature. In case where a solution of an organic polymer or an inorganic oxide precursor is applied by flexography under such a condition, the resultant organic polymer or inorganic oxide film is liable to be accompanied with an ununiformity of thickness distribution and/or surface undulation, which results in adverse effects to the final properties of the film. According to the present invention, a solution of an organic polymer or an inorganic oxide precursor is applied to a substrate to be printed while the substrate to be printed is temperature-controlled at a constant temperature above 30° C. within an accuracy of ±5° C. by equipping a flexographic apparatus with a temperature control means for keeping a stage for supporting the substrate at a constant temperature, so that the resultant film is provided with improved uniformity of film thickness, surface flatness and reproducibility thereof.

Hereinbelow, some embodiments of the present invention will be described with reference to the drawings.

FIGS. 1 and 2 illustrate principal features of an embodiment of the flexographic apparatus according to the present invention. The flexographic apparatus includes a stage 1 for supporting a substrate to be printed 11, a cylinder 2, a plate (rubber relief plate) 3 having a printing pattern, a supply nozzle 5 for supplying a printing liquid 4 supplied from a tank 6, an extension plate 8, and a doctor blade 7 for extending the printing liquid 4 on the extension plate 8.

EXAMPLE 1

In a specific example, the stage 1 was formed of a metal (e.g., stainless steel) having a smoothened surface, and the surface temperature thereof was controlled at a temperature of 20°–50° C. within an accuracy of ±1.0° C. by circulating a constant-temperature water controlled at a temperature of 20°–50° C.±0.5° C. within the stage 1 along a circulating path 10. Correspondingly, a substrate 11 fastened to and in intimate contact with the stage 1 by vacuum generated in vacuum grooves 13 leading to a vacuum pump was heated by conduction to a temperature of 20°–50° C.±2.0° C. within ten and several seconds. Generally, the substrate-to-be-printed should preferably be controlled within an accuracy of ±5° C., particularly ±3° C., according to measurement at, e.g., 9 points of the substrate by CA thermocouples directly applied to the substrate.

On the above-mentioned stage controlled at five constant temperatures of 20° C., 30° C., 35° C., 40° C. and 50° C., respectively, several glass plates (each measuring 300 mm×320 mm×1.1 mm-t) were successively placed, and a color filter ink containing a color filter resin comprising a photosensitive polyamide resin colored with a red colorant dispersed therein ("PA-1012R" (trade name), available from Ube Kosan K. K.) diluted to a viscosity of 500 centipoise with N-methylpyrrolidone (solvent) and extended on the extension plate 8 of SUS (stainless steel) having 36 μm-deep grooves (a groove widths of 27 μm and a convexity spacing of 25 μm between grooves, was applied onto the glass plates by a plate of a rubber ("CYREL" (trade name) available from E. I. Du Pont) having a rectangular relief pattern of 280 mm×300 mm under a plate impression of 0.15 mm.

The color filter films printed on the glass substrates at various temperatures showed properties as shown in the following Table 1.

TABLE 1

| Sample | Substrate temp. | Thickness | Undulation | Temp. range |
|---|---|---|---|---|
| No. 1 | 20° C. | 7650 ± 530 Å | 410 Å/8 mm | ±2° C. |
| No. 2 | 30° C. | 7930 ± 510 Å | 390 Å/8 mm | ±2° C. |
| No. 3 | 35° C. | 8320 ± 310 Å | 180 Å/8 mm | ±2° C. |
| No. 4 | 40° C. | 8500 ± 230 Å | 160 Å/8 mm | ±2° C. |
| No. 5 | 50° C. | 9380 ± 430 Å | 190 Å/8 mm | ±2° C. |

The thickness and the undulation of each film sample were measured at several points and pairs of 8 mm-distant points for each of the several points, respectively, by partly peeling the film in a width of 8 mm at the several points and measuring the thicknesses of the sides of the remaining films by a contacting needle-type surface roughness meter ("Surfcoder ET-30" (trade name) available from Kosaka Kenkyuso K.K.).

As is understood from the above Table 1, Sample Nos. 1 and 2 printed at 20°–30° C. provided a fluctuation in thickness exceeding ±7% and undulations of 390 Å or larger. In contrast thereto, Sample No. 3 printed at 35° C. provided a remarkably smaller fluctuation in thickness of within ±4% and a smaller undulation of 180 Å or less, and Sample No. 4 printed at 40° C. provided a fluctuation of within ±3% and an undulation of 160 Å or less. Sample No. 5 printed at 50° C. gave a thickness fluctuation of ±5% and an undulation of 190 Å which were not inferior to the results of Samples Nos. 3 and 4. However, Sample No. 5 showed some dryness due to evaporation of the solvent in the ink during the printing as the printing was continued on a large number of glass plates, and gradually provided inferior films.

The above results are considered to show that an elevated temperature exceeding 30° C. of the substrate promoted leveling of the printing liquid applied on the substrate but an excessively high temperature caused too high a drying speed, thus being liable to provide inferior film properties. However, the latter difficulty can be alleviated by using a solvent having a higher boiling point, while a temperature up to 50° C. is generally preferred.

As is understood from the above results, by using the above-mentioned flexographic apparatus to control the substrate to be printed at a constant temperature, a color filter film having a good thickness distributions and good surface roughness was formed on the glass plates.

Then, each color filter film was exposed through a photomask to ultraviolet rays at an intensity of 300 mJ/cm$^2$ to photocure the prescribed parts of the film, which was then developed with a prescribed developer liquid to remove the uncured part of the film by dissolution and then subjected to further curing in a clean oven at 200° C. for 1 hour to form a good red color filter pattern on the glass plate.

EXAMPLE 2

Similarly as in Example 1, on the above-mentioned stage controlled at five constant temperature of 20° C., 30° C., 35° C., 40° C. and 50° C., respectively, several glass plates (each measuring 300 mm×320 mm×1.1 mm-t) were successively placed, and a solution of a transparent polyamide resin ("PA-1000C" (trade name) available from Ube Kosan K.K.) which may be used to form, e.g., a protective film on a color filter, diluted to a viscosity of 500 centipoise with a mixture solvent of N-methylpyrrolidone/n-butylcellosolve and extended on the extension plate 8 of SUS having 30 μm-deep groove (a groove width of 275 μm and a convexity spacing of 25 μm between grooves), was applied onto the glass plates by a plate of EPT (ethylene-propylene terpolymer) having a rectangular relief pattern of 280 mm×300 μm under a plate impression of 0.15 mm.

The clear films printed on the glass substrates at various temperatures showed properties as shown in the following Table 2.

TABLE 2

| Sample | Substrate temp. | Thickness | Undulation | Temp. range |
|---|---|---|---|---|
| No. 1 | 20° C. | 10220 ± 400 Å | 390 Å/8 mm | ±2° C. |
| No. 2 | 30° C. | 10700 ± 250 Å | 290 Å/8 mm | ±2° C. |
| No. 3 | 35° C. | 11030 ± 190 Å | 160 Å/8 mm | ±2° C. |
| No. 4 | 40° C. | 11200 ± 160 Å | 150 Å/8 mm | ±2° C. |
| No. 5 | 50° C. | 12320 ± 230 Å | 220 Å/8 mm | ±2° C. |

As is understood from the above Table 2, Sample Nos. 3, 4 and 5 printed at 35°–50° C. provided fluctuations in thickness of within ±1.5–2.0% and undulations of 150–220 Å or smaller. In contrast thereto, Sample No. 1 printed at 20° C. showed inferior thickness distribution and smoothness (undulation) presumably because of insufficient leveling of the ink on the substrate. Further, Sample No. 2 printed at 30° C. showed a thickness distribution and a smoothness (undulation) which were better than those of Sample No. 1 but inferior to those of Samples Nos. 3–5 printed at 35°–50° C.

As the organic polymer material applicable in the present invention, it is also possible to use polyimides which may be used for forming alignment films principally used in liquid crystal devices, phenol-novolak resins having photosensitivity, high-temperature curable epoxy-type sealants for, e.g., liquid crystal devices. It is also possible to use, for application, a solution of an inorganic oxide precursor, examples of which may include hydroxides and organo-oxides of metals or metalloids such as silicon, titanium, tantalum, and zirconium. These inorganic oxide precursors may, for example, be heated after the printing to form a (patterned) film which may be used as an insulating film, a protective film, or a spacer member. It has been confirmed that the effect of temperature control of the substrate to be printed at a temperature above 30° C. is effective for forming a film having a uniform thickness and an improved flatness (less undulation) also of these materials.

As described above, by equipping a stage for supporting a substrate to be printed of a flexographic apparatus with a temperature control means, the substrate can be controlled at a temperature exceeding 30° C., preferably by 3° C. or more, within an accuracy of ±5° C., preferably ±3° C., further preferably ±2° C., whereby an organic polymer film or an inorganic oxide film can be stably formed at an improved thickness uniformity and a better flatness and with a good reproducibility by application of a solution of the organic polymer or an inorganic oxide precursor.

What is claimed is:

1. A method for making a color filter, comprising the steps of:

measuring a temperature of a substrate by a plurality of thermocouples directly applied to plural points of the substrate;

forming a colored organic polymer film on the substrate by applying a solution comprising a polyamide resin and a colorant onto the substrate using a flexographic apparatus comprising a cylinder and a plate held on said cylinder, said plate having a relief pattern for printing on the substrate, said flexographic apparatus further comprising a stage for supporting the substrate, a rectangular groove formed within the stage adapted to provide a vacuum therein and secure the substrate to the stage, and a temperature control means embedded within the stage for controlling the substrate at a prescribed temperature from 30°–50° C., said temperature control means including a path for circulating liquid having a controlled temperature, wherein said organic polymer solution is applied onto the substrate while the substrate is controlled within the prescribed temperature.

2. A method for making a color filter, comprising the steps of:

selecting a substrate with a color filter layer;

measuring a temperature of said substrate by a plurality of thermocouples directly applied to plural points of the substrate;

forming an organic polymer film on the substrate by applying a solution comprising a photosensitive phenol-novolak resin onto the substrate using a flexographic apparatus comprising a cylinder and a plate held on said cylinder, said plate having a relief pattern for printing on the substrate, said flexographic apparatus further comprising a stage for supporting the substrate, a rectangular groove formed within the stage adapted to provide a vacuum therein and secure the substrate to the stage, and a temperature control means embedded within the stage for controlling the substrate at a prescribed temperature from 30°–50° C., said temperature control means including a path for circulating liquid having a controlled temperature, wherein said organic polymer solution is applied onto the substrate while the substrate is controlled within the prescribed temperature.

* * * * *

UNITED STATES PATENT AND TRADEMARK OFFICE
CERTIFICATE OF CORRECTION

PATENT NO.    : 5,714,197
DATED         : February 3, 1998
INVENTOR(S)   : Masaaki Suzuki et al.

It is certified that error appears in the above-identified patent and that said Letters Patent is hereby corrected as shown below:

Column 3,
Line 32, "grooves," should read -- grooves), --.

Column 4,
Line 16, "distributions" should read -- distribution --; and
Line 29, "temperature" should read -- temperatures --.

Column 5,
Line 33, "substrate;" should read -- substrate; and --.

Column 6,
Line 19, "substrate;" should read -- substrate; and --.

Signed and Sealed this

Fifteenth Day of April, 2003

JAMES E. ROGAN
*Director of the United States Patent and Trademark Office*